United States Patent
Fukuda et al.

(10) Patent No.: US 8,832,701 B2
(45) Date of Patent: Sep. 9, 2014

(54) MANAGEMENT APPARATUS, MANAGEMENT SYSTEM, AND RECORDING MEDIUM FOR RECORDING MANAGEMENT PROGRAM

(75) Inventors: Masahiro Fukuda, Kawasaki (JP); Jun Yoshii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 100 days.

(21) Appl. No.: 13/064,486

(22) Filed: Mar. 28, 2011

(65) Prior Publication Data

US 2011/0296425 A1 Dec. 1, 2011

(30) Foreign Application Priority Data

May 28, 2010 (JP) ................. 2010-122733

(51) Int. Cl.
G06F 9/46 (2006.01)
G06F 9/48 (2006.01)
(52) U.S. Cl.
CPC .................. *G06F 9/4881* (2013.01)
USPC ...................................................... 718/102
(58) Field of Classification Search
USPC ........................................................ 718/102
See application file for complete search history.

(56) References Cited

U.S. PATENT DOCUMENTS

| | | | |
|---|---|---|---|
| 5,465,354 A * | 11/1995 | Hirosawa et al. | 718/106 |
| 7,516,458 B2 * | 4/2009 | Babutzka et al. | 718/106 |
| 2003/0149717 A1 * | 8/2003 | Heinzman | 709/101 |
| 2008/0120617 A1 * | 5/2008 | Keller et al. | 718/101 |
| 2008/0163219 A1 * | 7/2008 | Marwinski | 718/101 |
| 2009/0083746 A1 * | 3/2009 | Katsumata | 718/103 |

FOREIGN PATENT DOCUMENTS

| | | |
|---|---|---|
| JP | 05-210682 | 8/1993 |
| JP | 06-282446 | 10/1994 |
| JP | 08-272626 | 10/1996 |
| JP | 09-282192 | 10/1997 |
| JP | 2000-181735 | 6/2000 |
| JP | 2005-071171 | 3/2005 |
| JP | 2006-221317 | 8/2006 |
| JP | 2006-268509 | 10/2006 |

OTHER PUBLICATIONS

Japanese Office Action mailed Feb. 4, 2014 for corresponding Japanese Application 2010-122733.

* cited by examiner

*Primary Examiner* — Emerson Puente
*Assistant Examiner* — Steven Do
(74) *Attorney, Agent, or Firm* — Staas & Halsey LLP

(57) ABSTRACT

Method and apparatus of job management including specifying an intermitted job from job execution data which includes statuses of a plurality of executed jobs and a plurality of planned jobs. The job execution data is used to determine whether a corresponding planned job is scheduled to execute a same operation as the intermitted job. An operation condition which includes information associating the intermitted job and the corresponding planned job is specified for the intermitted job based on the job execution data and a result of the determination. Re-execution of the intermitted job is controlled based on the operation condition specified.

15 Claims, 23 Drawing Sheets

| JOB IDENTIFICATION NAME | COMMAND | START CONDITION | ISSUE MESSAGE | STATE | CHARACTERISTIC | ESTIMATED EXECUTION TIME (SECOND) | PRIORITY | START SCHEDULE TIME | ... |
|---|---|---|---|---|---|---|---|---|---|
| A | cmdA.exe | TIME (10:00) | msgA | | PARALLEL EXECUTION | 1800 | 5 | | ... |
| B | cmdB.exe | MESSAGE (msgA) | msgB | | COMPLETION WAIT | 1200 | 5 | | ... |
| C | cmdC.exe | MESSAGE (msgB) | — | | PARALLEL EXECUTION | 1200 | 5 | | ... |
| D | cmdD.exe | MESSAGE (msgB) | — | | PARALLEL EXECUTION | 1800 | 5 | | ... |
| ... | ... | ... | ... | ... | ... | ... | ... | ... | ... |

FIG. 2

| EXCLUSION DEFINITION No. | JOB 1 | JOB 2 |
|---|---|---|
| 1 | A | B |
| 2 | A | E |
| 3 | C | D |
| 4 | C | G |

FOR 12/1

| JOB IDENTIFICATION NAME | COMMAND | START CONDITION | ISSUE MESSAGE | STATE | CHARACTERISTIC | ESTIMATED EXECUTION TIME (SECOND) | PRIORITY | START SCHEDULE TIME |
|---|---|---|---|---|---|---|---|---|
| A | cmdA.exe | TIME (10:00) | msgA | NORMAL COMPLETION | PARALLEL EXECUTION | 1800 | 5 | 10:00 |
| B | cmdB.exe | MESSAGE (msgA) | msgB | ABNORMAL TERMINATION | ※ | 1200 | 5 | 10:30 |
| C | cmdC.exe | MESSAGE (msgB) | — | WAIT | PARALLEL EXECUTION | 1200 | 5 | 10:50 |
| D | cmdD.exe | MESSAGE (msgB) | — | WAIT | PARALLEL EXECUTION | 1800 | 5 | 11:10 |
| ... | ... | ... | ... | ... | ... | ... | ... | ... |

FOR 12/2

| JOB IDENTIFICATION NAME | COMMAND | START CONDITION | ISSUE MESSAGE | STATE | CHARACTERISTIC | ESTIMATED EXECUTION TIME (SECOND) | PRIORITY | START SCHEDULE TIME |
|---|---|---|---|---|---|---|---|---|
| A | cmdA.exe | TIME (10:00) | msgA | WAIT | PARALLEL EXECUTION | 1800 | 5 | 10:00 |
| B | cmdB.exe | MESSAGE (msgA) | msgB | WAIT | ※ | 1200 | 5 | 10:30 |
| C | cmdC.exe | MESSAGE (msgB) | — | WAIT | PARALLEL EXECUTION | 1200 | 5 | 10:50 |
| D | cmdD.exe | MESSAGE (msgB) | — | WAIT | PARALLEL EXECUTION | 1800 | 5 | 11:10 |
| ⋮ | ⋮ | ⋮ | ⋮ | ⋮ | ⋮ | ⋮ | ⋮ | ⋮ |

| DATE | JOB IDENTIFICATION NAME |
|---|---|
| 12/1 | B |
| 12/1 | C |
| 12/1 | D |

FIG. 8

| EXECUTION POSSIBLE TIME ZONE No. | START TIME | END TIME |
|---|---|---|
| 1 | 8:00 | 10:00 |
| 2 | 10:10 | 13:00 |
| 3 | 13:30 | 20:00 |

FIG. 9

FOR 12/1

| JOB IDENTIFICATION NAME | COMMAND /ARGUMENT | START CONDITION | ISSUE MESSAGE | STATE | CHARACTERISTIC | ... |
|---|---|---|---|---|---|---|
| A | cmdA.exe | TIME (10:00) | msgA | NORMAL COMPLETION | PARALLEL EXECUTION | ... |
| B | cmdB.exe | MESSAGE (msgA) | msgB | WAIT | COMPLETION WAIT | ... |
| C | cmdC.exe | MESSAGE (msgB) | – | WAIT | PARALLEL EXECUTION | ... |
| D | cmdD.exe | MESSAGE (msgB) | – | WAIT | PARALLEL EXECUTION | ... |
| ... | ... | ... | ... | ... | ... | ... |

| FOR 12/2 | | | | | |
|---|---|---|---|---|---|
| JOB IDENTIFICATION NAME | COMMAND /ARGUMENT | START CONDITION | ISSUE MESSAGE | STATE | CHARACTERISTIC | ... |
| A | cmdA.exe | TIME (10:00) | msgA | WAIT | PARALLEL EXECUTION | ... |
| B | cmdB.exe | MESSAGE (msgA and msgB1201) | msgB | WAIT | COMPLETION WAIT | ... |
| C | cmdC.exe | MESSAGE (msgB) | — | WAIT | PARALLEL EXECUTION | ... |
| D | cmdD.exe | MESSAGE (msgB) | — | WAIT | PARALLEL EXECUTION | ... |
| ... | ... | ... | ... | ... | ... | ... |

23t

FOR 12/1

| JOB IDENTIFICATION NAME | COMMAND /ARGUMENT | START CONDITION | ISSUE MESSAGE | STATE | CHARACTERISTIC | ... |
|---|---|---|---|---|---|---|
| A | cmdA.exe | TIME (10:00) | msgA | NORMAL COMPLETION | PARALLEL EXECUTION | ... |
| B | cmdB.exe | MESSAGE (msgA) | msgB | WAIT | PARALLEL EXECUTION | ... |
| C | cmdC.exe | MESSAGE (msgB) | – | WAIT | PARALLEL EXECUTION | ... |
| D | cmdD.exe | MESSAGE (msgB) | – | WAIT | PARALLEL EXECUTION | ... |
| ... | ... | ... | ... | ... | ... | ... |

FOR 12/1

| JOB IDENTIFICATION NAME | COMMAND /ARGUMENT | START CONDITION | ISSUE CONDITION MESSAGE | STATE | CHARACTERISTIC |
|---|---|---|---|---|---|
| A | cmdA.exe | TIME (10:00) | msgA | WAIT | PARALLEL EXECUTION |
| B | cmdB.exe | MESSAGE (msgA) | msgB | INVALID | DISCONTINUATION |
| C | cmdC.exe | MESSAGE (msgB) | — | WAIT | PARALLEL EXECUTION |
| D | cmdD.exe | MESSAGE (msgB) | — | WAIT | PARALLEL EXECUTION |
| ... | ... | ... | ... | ... | ... |

23p

FOR 12/2　23t

| JOB IDENTIFICATION NAME | COMMAND /ARGUMENT | START CONDITION | ISSUE MESSAGE | STATE | CHARACTERISTIC |
|---|---|---|---|---|---|
| A | cmdA.exe | TIME (10:00) | msgA | WAIT | PARALLEL EXECUTION |
| B | cmdB.exe | MESSAGE (msgA) | msgB and msgB1201 | WAIT | DISCONTINUATION |
| C | cmdC.exe | MESSAGE (msgB) | – | WAIT | PARALLEL EXECUTION |
| D | cmdD.exe | MESSAGE (msgB) | – | WAIT | PARALLEL EXECUTION |
| ... | ... | ... | ... | ... | ... |

FIG. 14

FOR 12/1                                                                                                                   23p

| JOB IDENTIFICATION NAME | COMMAND /ARGUMENT | START CONDITION | ISSUE MESSAGE | STATE | CHARACTERISTIC | ESTIMATED EXECUTION TIME (SECOND) | PRIORITY | START SCHEDULE TIME |
|---|---|---|---|---|---|---|---|---|
| A | cmdA.exe | TIME (10:00) | msgA | WAIT | PARALLEL EXECUTION | 1800 | 5 | 10:00 |
| B | cmdB.exe | MESSAGE (msgA) | msgB | WAIT | ※ | 1200 | 5 | 10:30 |
| C | cmdC.exe | MESSAGE (msgB) | — | WAIT | PARALLEL EXECUTION | 1200 | 5 | 10:50 |
| D | cmdD.exe | MESSAGE (msgB) | — | WAIT | PARALLEL EXECUTION | 1800 | 5 | 11:10 |
| E | cmdE.exe | TIME (12:00) | — | WAIT | PARALLEL EXECUTION | 60 | 2 | 12:00 |
| F | cmdF.exe | TIME (13:00) | — | WAIT | PARALLEL EXECUTION | 3000 | 5 | 13:00 |
| G | cmdG.exe | TIME (18:00) | msgG | WAIT | PARALLEL EXECUTION | 60 | 3 | 18:00 |
| H | cmdH.exe | MESSAGE (msgG) | — | WAIT | PARALLEL EXECUTION | 60 | 1 | 18:01 |
| ⋮ | | | | | | | | ⋮ |

FIG. 17

FOR 12/2

| JOB IDENTIFICATION NAME | COMMAND /ARGUMENT | START CONDITION | ISSUE MESSAGE | STATE | CHARACTERISTIC | ESTIMATED EXECUTION TIME (SECOND) | PRIORITY | START SCHEDULE TIME | ... |
|---|---|---|---|---|---|---|---|---|---|
| A | cmdA.exe | TIME (10:00) | msgA | WAIT | PARALLEL EXECUTION | 1800 | 5 | 10:00 | ... |
| B | cmdB.exe | MESSAGE ( msgA and 12/1 msgB ) | msgB | WAIT | ※ | 1200 | 5 | 10:50 | ... |
| C | cmdC.exe | MESSAGE (msgB) | — | WAIT | PARALLEL EXECUTION | 1200 | 5 | 11:10 | ... |
| D | cmdD.exe | MESSAGE (msgB) | — | WAIT | PARALLEL EXECUTION | 1800 | 5 | 11:30 | ... |
| E | cmdE.exe | TIME (12:00) | — | WAIT | PARALLEL EXECUTION | 60 | 2 | 12:00 | ... |
| F | cmdF.exe | TIME (13:00) | — | WAIT | PARALLEL EXECUTION | 3000 | 5 | 13:00 | ... |
| G | cmdG.exe | TIME (18:00) | msgG | WAIT | PARALLEL EXECUTION | 60 | 3 | 18:00 | ... |
| H | cmdH.exe | MESSAGE (msgG) | — | WAIT | PARALLEL EXECUTION | 60 | 1 | 18:01 | ... |

MANAGEMENT APPARATUS, MANAGEMENT SYSTEM, AND RECORDING MEDIUM FOR RECORDING MANAGEMENT PROGRAM

CROSS-REFERENCE TO RELATED APPLICATION

This application is based upon and claims the benefit of priority of the prior Japanese Patent Application No. 2010-122733 filed on May 28, 2010, the entire contents of which are incorporated herein by reference.

FIELD

The present invention relates to a management apparatus for managing a job execution schedule. More particularly, the present invention relates to an apparatus and a computer-readable medium recording a management program, which, in an execution schedule of already set jobs, manage the execution schedule by adjusting a restart schedule of a job whose execution is not normally completed.

BACKGROUND

As for a job management apparatus which starts a predetermined job on the basis of the execution schedule of the job to thereby manage the execution of the job, a job management apparatus is known, which sets the start schedule of the job on the basis of a holiday pattern specified beforehand.

Further, a job management apparatus is known, which specifies the start day of the job with respect to the other job, so as to make the start schedule of the job on the basis of the specified start day.

Further, a job management apparatus is known, which detects a batch job interrupted by a system failure, and which, when the interrupted batch job can be re-executed (re-run), automatically restores (recovers) the job.

The following are documents describe technical backgrounds of the discussed embodiment: Japanese Patent Laid-Open No. 2000-181735

In the case where a schedule is set so as to allow a plurality of jobs to be repeatedly executed at every predetermined execution period (for example, each day), among jobs that have been abnormally terminated, and among jobs that have not been started in association with the abnormally terminated jobs (hereinafter both kinds of the jobs are simply referred to as uncompleted jobs), there are a job that needs to be re-executed in a next execution schedule and a job that does not need to be re-executed in the next execution schedule.

Here, it is presupposed that the start schedule of the jobs is already set in the execution schedule into which the job to be re-executed is to be incorporated. For this reason, when a free time in the execution schedule, into which the job to be re-executed is to be incorporated, that is, a time zone into which the job to be re-executed can be incorporated, is not enough, it is necessary to determine whether the start schedule of the job to be re-executed needs to be incorporated. Further, when the start schedule of the job to be re-executed is incorporated, it is necessary to adjust the start schedule of the jobs in consideration of the restrictions, such as the start condition, the exclusion condition, the priority order, and the like, between the job whose start schedule is already set and the job to be re-executed.

Therefore, conventionally, after restoration of the abnormally terminated job, the determination of the need of re-execution of the job and the adjustment of the execution schedule for incorporating the re-execution of the job into the execution schedule have been manually performed by the schedule manager. However, in the case where a lot of jobs are scheduled to be executed, it is very difficult to manually perform the adjustment of the start schedule of the jobs, while satisfying the restrictions on the setting of the schedule.

SUMMARY

The outline of a management apparatus disclosed as an aspect of the present invention is described briefly as follows. That is, the management apparatus is configured to manage an execution schedule in which a start schedule of a job is set for each predetermined period, and is featured by including: 1) a job definition information storage section for storing, at each predetermined period, a job definition file including execution characteristics indicating the start condition of each of the jobs in the execution schedule, the estimated execution time of the job, the state of the job, and restrictions at the time of setting the start schedule of the jobs; 2) an exclusion information storage section for storing exclusion definition information indicating jobs to be executed exclusively from each other; 3) a reset job specifying section for acquiring a first job definition file to be executed and an executed second job definition file, then extracting, as a reset job, an abnormally terminated job from the second job definition file, and extracting a job using, as start conditions, the reset job and the issue message of the reset job, so as to store the extracted jobs in a related job set table; 4) an execution possible time zone calculating section for searching, as an execution possible time zone, a time zone enabling execution of the job stored in the related job set table, from the first job definition file on the basis of the second job definition file and the exclusion definition information; 5) a start schedule adjusting section for setting the start schedule of the job stored in the related job set table on the basis of the execution possible time zone; and 6) a start schedule time setting section for setting the start time of the job set in the first job definition file, on the basis of the start schedule of the job stored in the related job set table.

Further, a computer-readable medium recording a management program disclosed as another aspect of the present invention is configured such that a computer including the job definition information storage section, the exclusion information storage section, and a schedule information storage section is made to perform processing realized by each of the processing sections of the management apparatus.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a figure illustrating an example of a data configuration of a job definition master file;

FIG. 6 is a figure illustrating an example of a data configuration of a job definition file (for 12/1);

FIG. 7 is a figure illustrating an example of a data configuration of a job definition file (for 12/2);

FIG. 8 is a figure illustrating an example of a related job collection table;

FIG. 9 is a figure illustrating an example of an execution possible time zone table;

FIGS. 10 and 11 are figures for explaining the adjustment of the start schedule of a job when the characteristic of the job is "completion wait";

FIG. 12 is a figure for explaining the adjustment of the start schedule of a job when the characteristic of the job is "parallel execution";

FIGS. 13 and 14 are figures for explaining the adjustment of the start schedule of a job when the characteristic of the job is "discontinuation";

FIGS. 17 and 18 are figures each illustrating an example of the job definition file, in which the start schedule times of the jobs are set;

DESCRIPTION OF THE EMBODIMENTS

Figure 1:
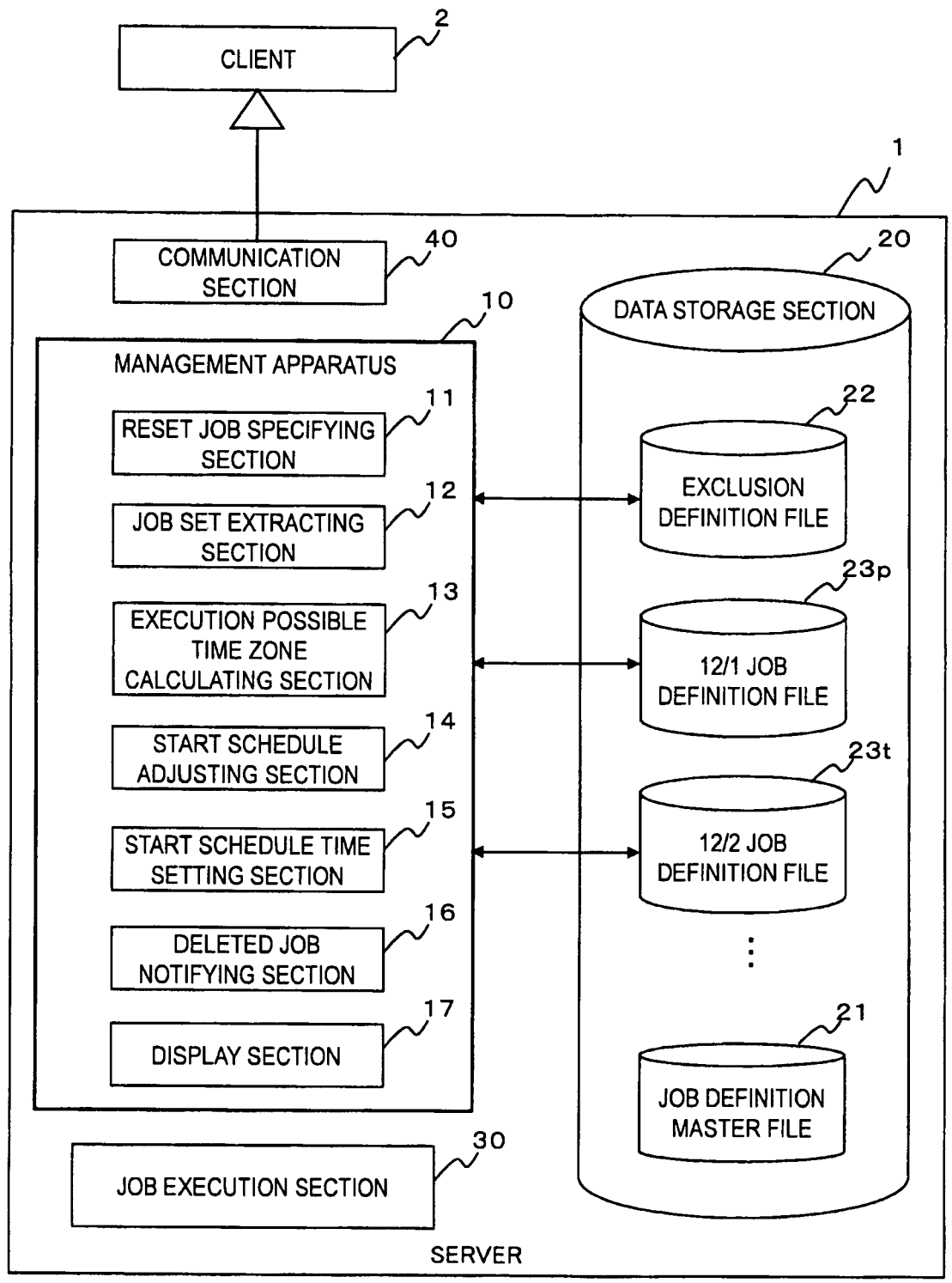
FIG. 1 is a figure illustrating a configuration example of an embodiment of a management apparatus disclosed in the present invention.

FIG. 1 is a figure illustrating a configuration example of an embodiment of a management apparatus disclosed in the present invention.

A management apparatus 10 is provided in a server 1.

The server 1 is a computer for executing a predetermined job, and can transmit information relating to the execution of the job to a client 2 which is a computer used by a user.

The server 1 includes a data storage section 20, a job execution section 30, and a communication section 40 in addition to the management apparatus 10.

The data storage section 20 stores data used in the management apparatus 10. The data storage section 20 stores a job definition master file 21, an exclusion definition file 22, and a job definition file 23 which is set for each predetermined execution period. The detailed explanation of each of the files will be described below.

The job execution section 30 is a processing section which executes a predetermined job on the basis of the job definition file indicating the start schedule of the job for each predetermined execution period.

Here, the execution period indicates a unit of execution period in a job execution schedule, and is set to a unit of one day in the present embodiment. The job execution section 30 executes each job on the basis of the start schedule of the job which is set in the job definition file 23 indicating an execution schedule corresponding to, for example, a time zone of 8:00 to 20:00 of each day.

The communication section 40 is a processing section which transmits, to the client 2, data including data generated by the management apparatus 10.

The job definition master file 21 is a data file which includes definition information about the execution of each job.

FIG. 2 is a figure illustrating an example of a data configuration of the job definition master file 21.

The job definition master file 21 includes, for each job, data items, such as "job identification name", "command", "start condition", "issue message", "state", "characteristic", "estimated execution time", "priority", and "start schedule time".

The data item of "job identification name" is information indicating a name which enables a job to be uniquely identified. The data item of "command" is information indicating a command to be executed as a job.

The data item of "start condition" is information indicating a condition for starting a job. As the start condition, for example, "time start", "message start", and the like, are set. The start condition of "time start" is a condition for starting a job upon arrival of a set time (10:00). The start condition of "message start" is a condition for starting a job upon issuance of a set message (msgA).

The data item of "issue message" is information indicating a message (msgA) issued at the time of completion of a job.

The data item of "state" is information indicating the state of a job, and one of "normal completion", "abnormal termination", "wait" and "invalid" is set as the state. The state of "wait" indicates that a job is in the start-standby state. The state of "invalid" indicates that a job is not started even when the start condition of the job is satisfied.

In the job definition master file 21, the data item of "state" is not set or is set to "wait" as the initial state. The data item of "state" is changed to one of the above described states according to the execution of the schedule based on the job definition file 23 generated from the job definition master file 21.

The data item of "estimated execution time" is a time period estimated to be required from the start to the end of execution of a job. The data item of "priority" is information indicating the priority of execution of a job.

The data item of "characteristic" is information indicating a characteristic relating to execution of a job. As the data item of "characteristic", one of "parallel execution", "completion wait", and "discontinuation" is set.

The data item of "start schedule time" is information indicating a time when a job is to be started.

Figure 3A:
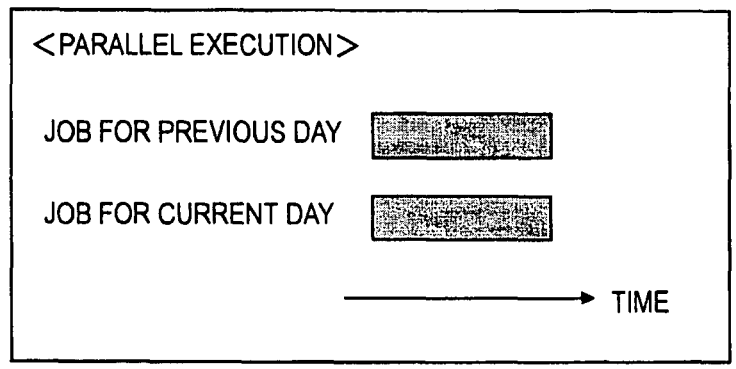
FIGS. 3A, 3B and 3C are figures for explaining job start restrictions based on the characteristics of jobs.
Figure 3B:
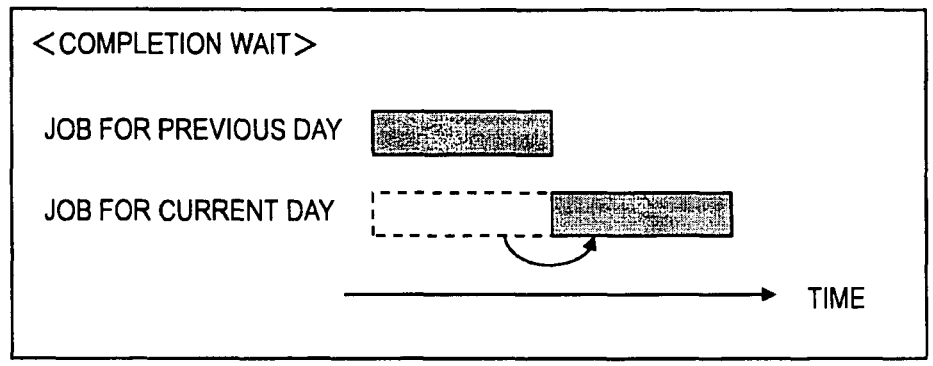
Figure 3C:
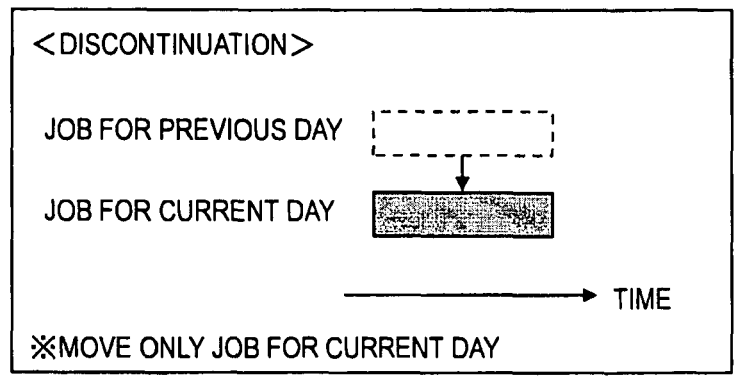

FIGS. 3A, 3B and 3C are figures for explaining job-start restrictions based on the execution characteristics.

The characteristic of "parallel execution" indicates that, as shown FIG. 3A, when the start schedule of a job (job for the previous day) is to be reset, and when the same job (job for the current day) as the job for the previous day is set in the execution period of the schedule, the start schedule of the job for the previous day can be set independently of the start schedule of the job for the current day.

The characteristic of "completion wait" indicates a restriction that, as shown in FIG. 3B, when the start schedule of a job (job for the previous day) is to be reset, and when the same job (job for the current day) as the job for the previous day is set in the execution period of the schedule, the execution of the job for the previous day must be completed before the execution of the job for the current day. That is, the start schedule of the job with the characteristic of "completion wait" is adjusted so that the start schedule time and the execution completion of the job for the previous day are prior to the start schedule time of the job for the current day.

The characteristic of "discontinuation" indicates a restriction that, as shown in FIG. 3C, when the start schedule of a job (job for the previous day) is to be reset, and when the same job (job for the current day) as the job for the previous day is set in the execution period of the schedule, the execution of the job for the previous day is discontinued. That is, as for a job with the characteristic of "discontinuation", the job for the previous day is deleted from the target of the reset processing. Thus, on the schedule, the job for the previous day is also handled as a normally completed job.

Figures 4, 5:
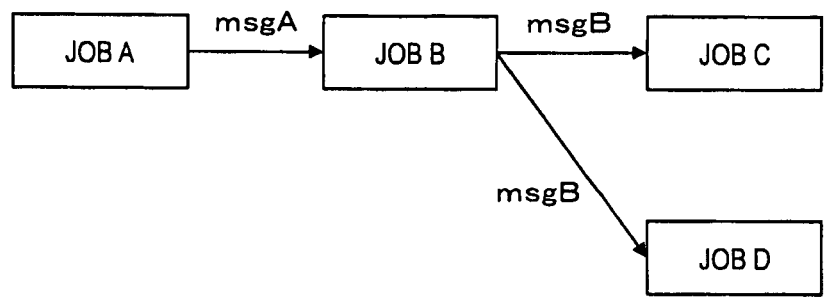
FIG. 4 is a figure illustrating a relationship between jobs based on the definition information in the job definition master file shown in FIG. 2.
FIG. 5 is a figure illustrating an example of a data configuration of an exclusion definition file.

FIG. 4 is a figure illustrating a relationship between jobs based on the definition information of the job definition master file 21 shown in FIG. 2.

FIG. 4 shows that after a job A is started upon arrival of the set time (10:00) as the start condition, a job B is started upon issuance of a message msgA at the completion of execution of the job A, and then jobs C and D are started upon issuance of a message msgB at the completion of execution of the job B.

The exclusion definition file 22 is a data file including an exclusion definition indicating jobs which need to be executed exclusively from each other in an execution schedule.

FIG. 5 is a figure illustrating an example of a data configuration of the exclusion definition file 22.

The exclusion definition file 22 includes, for each exclusion definition, an exclusion definition number (exclusion definition No.) for enabling the exclusion definition to be uniquely identified, and data items, such as job 1 and job 2, indicating a job group subjected to the restriction of exclusive execution.

FIG. 5 shows that the exclusion definition No. 1 inhibits the parallel execution of the job A and the job B, and also shows that the exclusion definition No. 3 inhibits the parallel execution of the job C and the job D.

Therefore, in the relationship between the jobs shown in FIG. 4, the start schedule of the job C and the job D is adjusted and set on the basis of the exclusion definition No. 3 in the exclusion definition file 22 shown in FIG. 5 so that the execution time of the job C and the execution time of the job D are prevented from overlapping each other.

The job definition file 23 is a data file in which the definition information, the start schedule time, and the state during execution, and the like, are set for each of the jobs executed for each predetermined execution period.

In the present embodiment, the job definition file 23 is generated from the job definition master file 21 by a schedule creation function for each day that is the unit of execution period.

Note that the management apparatus 10 performs the schedule adjustment processing by referring to the job definition file 23 which is stored in the data storage section 20 and which is set for each unit of execution period. The job definition file 23 is created from the job definition master file 21 by a known schedule creation function. Although the server 1 includes the schedule creation function, the processing operation of the schedule creation function is known and is not directly related to the processing performed by the management apparatus 10. Thus, the explanation of the schedule creation function is omitted here.

FIG. 6 and FIG. 7 are figures illustrating examples of data configuration of the job definition file 23.

A job definition file 23p shown in FIG. 6 is an example of a job definition file (12/1 job definition file) in which a schedule for December 1 that is the previous execution day of the schedule is set. A job definition file 23t shown in FIG. 7 is an example of a job definition file (12/2 job definition file) in which a schedule for December 2 that is the future execution day of the schedule is set.

Each of the job definition files 23p and 23t shown in FIG. 6 and FIG. 7 includes data items, such as "job identification name", "command", "start condition", "issue message", "state", "characteristic", "estimated execution time", "priority", and "start schedule time", similarly to the job definition master file 21.

The data items of "job identification name", "command", "start condition", "issue message", and "characteristic" are set from the corresponding definition information in the job definition master file 21.

The data item of "start schedule time" is set by a start schedule time setting section 15.

The data item of "state" is set or updated by a start schedule adjusting section 14.

Note that the mark "*" described in the data item of "characteristic" of the job B indicates that one of the characteristics of "completion wait", "parallel execution" and "discontinuation" is set.

The 12/1 job definition file 23p shown in FIG. 6 reflects the state of jobs during execution. In the job A, "state: normally completed" indicates that the job was started and normally completed, while in the job B, "state: abnormally terminated" indicates that the job was started but abnormally terminated". In the jobs C and D, "state: wait" indicates that the start conditions are not satisfied and the jobs are not started. The 12/1 job definition file 23p is an example of the second job definition file. Here, the abnormally terminated job B corresponds to a reset job, and the jobs C and D, which are not started due to the abnormal termination of the job B, correspond to related jobs. These jobs correspond to the reset jobs which are the target of the schedule adjustment processing.

The 12/2 job definition file 23t shown in FIG. 7 represents a schedule to be executed in future, and "state: wait" of the jobs A to D indicates that the jobs are not started. Therefore, the 12/2 job definition file 23t serves as a file into which the start schedule of the above described reset jobs, and the like, is incorporated, and is an example of the first job definition file.

The management apparatus 10 includes a reset job specifying section 11, a job set extracting section 12, an execution possible time zone calculating section 13, the start schedule adjusting section 14, the start schedule time setting section 15, a deleted job notifying section 16, and a display section 17.

The reset job specifying section 11 acquires the first job definition file indicating an execution schedule to be executed, and a second job definition file indicating an executed execution schedule, and extracts an abnormally terminated job from the second job definition file, so as to set the extracted job as a reset job.

Specifically, the reset job specifying section 11 acquires, on the basis of the user-specified information received from the client 2, the 12/2 job definition file 23t and the 12/1 job definition file 23p from the data storage section 20 and extracts, from the 12/1 job definition file 23p, the job B in which the data item of "state" is set as "abnormally terminated".

With reference to the 12/1 job definition file 23p, the job set extracting section 12 extracts jobs related to the start condition of each reset job defined by the reset job specifying section 11, and sets the extracted jobs as a job set.

Specifically, the job set extracting section 12 generates a related job set table, and sets, in the related job set table, the job B which is included in the 12/1 job definition file 23p and defined as the reset job. Further, the job set extracting section 12 extracts the jobs C and D using the issue message (msgB) of the job B as the start condition, and sets the extracted jobs C and D in the related job set table.

FIG. 8 is a figure illustrating an example of the related job set table.

In the related job set table, the information (date) indicating the second job definition file as the extraction source, and job identification names of the extracted reset job and of the extracted related jobs are set.

An example shown in FIG. 9 indicates that the job B and the jobs C and D related to the job B are extracted from the 12/1 job definition file 23p and configure a job set.

With reference to the 12/1 job definition file 23p, the 12/2 job definition file 23t, and the exclusion definition file 22, the execution possible time zone calculating section 13 searches a time zone enabling the reset job to satisfy the set definition information and to be executed, from within the execution period of the 12/2 job definition file 23t, and sets the searched time zone as an execution possible time zone.

Specifically, on the basis of the definition information, such as the start schedule time, the estimated execution time, and the start condition, of the reset job and the jobs related to the reset job in the 12/2 job definition file 23t, and on the basis of the definition information in the 12/1 job definition file 23p, and of the exclusion definition in the exclusion definition file 22, the execution possible time zone calculating section 13 searches a time zone enabling execution of the reset job B, and sets the searched the time zone in an execution possible time zone table.

FIG. 9 is a figure illustrating an example of the execution possible time zone table.

In the execution possible time zone table, the execution possible time zone No. for allowing the searched time zone to be uniquely specified, and the start time and end time of the execution possible time zone are set.

The execution possible time zone table shown in FIG. 9 indicates that three free time periods (time zones) enabling execution of the reset job B are searched from the job execution time period (8:00 to 20:00) of the job execution section 30, and for example, one (execution possible time zone No. 1) of the execution possible time zones is the time zone from 8:00 to 10:00.

Further, when, with reference to the start schedule deletion table as will be described below, the execution possible time zone calculating section 13 determines that there is a job whose start schedule is deleted, then on the basis of the definition information in the 12/2 job definition file 23t except the definition information of the job whose start schedule is deleted, the execution possible time zone calculating section 13 searches the time zone enabling execution of the reset job B, and updates the execution possible time zone table.

The start schedule adjusting section 14 performs one of the first processing and the third processing on the basis of the characteristic of the job, and adjusts the execution schedule so as to incorporate the reset job B, and the like, into the schedule based on the 12/2 job definition file 23t.

When the characteristic of the reset job (12/1 job B) is set as "completion wait", the start schedule adjusting section 14 performs the first processing for setting the start schedule of the reset job (12/1 job B) in the time which is included in the execution possible time zone table based on the 12/2 job definition file 23t, and which enables the execution of the reset job to be completed before the start schedule time of the same job (12/2 job B).

Figure 11:

Specifically, when, with reference to the characteristics in the 12/1 job definition file 23p, the start schedule adjusting section 14 determines that the characteristic of the reset job B is set to be "completion wait", then the start schedule adjusting section 14 updates "abnormal termination" of "state" of the job B in the 12/1 job definition file 23p to "wait" as shown in FIG. 10, and changes "start condition" of the job B in the 12/2 job definition file 23t to "message (msgA and msgB1201) as shown in FIG. 11.

The "message msgB1201" means a message issued at the time of completion of the 12/1 job B, that is, the reset job B. The start condition "message (msgA and msgB1201)" indicates that the 12/2 job B is started by issuance of the message msgA of the job A for the same day, and by issuance of the message msgB1201 of the reset job B for 12/1.

Further, the start schedule adjusting section 14 determines whether a time zone, in which the execution of the reset job (12/1 job B) can be completed before the start schedule time of the same job (12/2 job B), exists in the execution possible time zone table based on the 12/2 job definition file 23t, and sets the start schedule of the reset job B in the corresponding execution possible time zone.

Thereby, the schedule is set such that, when the job execution section 30 subsequently performs the job, the reset job B (12/1 job B) is again started on the basis of the 12/1 job definition file 23p shown in FIG. 10, and the ordinary job B (12/2 job B) is started on the basis of the 12/2 job definition file 23t shown in FIG. 11 after the normal completion of the reset job B.

Alternatively, when the characteristic of the reset job (12/1 job B) is "parallel execution", the start schedule adjusting section 14 performs the second processing for setting the start schedule of the reset job (12/1 job B) in a time zone which is included in the execution possible time zone obtained from the 12/2 job definition file 23t, and which enables the execution of the reset job (12/1 job B) to be completed.

Specifically, when, with reference to the characteristics of the second job definition file, the start schedule adjusting section 14 determines that the characteristic of the reset job B is "parallel execution", then the start schedule adjusting section 14 updates "abnormal termination" of "state" of the job B in the 12/1 job definition file 23p to "wait".

Further, the start schedule adjusting section 14 determines whether a time zone, in which the estimated execution time of the reset job (12/1 job B) can be incorporated, exists in the execution possible time zone table based on the 12/2 job definition file 23t, and sets the start schedule of the reset job B in a corresponding execution possible time zone.

Thereby, the schedule is set such that, when the job execution section 30 subsequently executes the job, the reset job B (12/1 job B) is again started on the basis of the 12/1 job definition file 23p shown in FIG. 12.

Alternatively, when the characteristic of the reset job (12/1 job B) is "discontinuation", the start schedule adjusting section 14 performs the third processing for deleting the start schedule of the reset job (12/1 job B) from the schedule based on the 12/2 job definition file 23t.

Specifically, when, with reference to the characteristics of the 12/1 job definition file 23p, the start schedule adjusting section 14 determines that the characteristic of the reset job B is "discontinuation", then the start schedule adjusting section 14 updates "abnormal termination" of "state" of the job B in the 12/1 job definition file 23p to "invalid" as shown in FIG.

13, and changes "issue message" of the job B in the 12/2 job definition file 23*t* to "msgB and msgB1201" as shown in FIG. 14.

As described above, "msgB1201" means the message which is issued at the time of completion of the 12/1 job B, that is, the reset job B. The issue message "msgA and msgB1201" indicates that the message msgB of the job B for 12/2 and the message msgB1201 of the reset job B for 12/1 are issued at the time of completion of the job B for 12/2.

Thereby, the 12/1 job B, which does not need to be re-executed, can be deleted from the target of schedule adjustment while maintaining the consistency with the start conditions of the other jobs.

When the start schedule adjusting section 14 determines that an execution possible time zone, in which the estimated execution time of the reset job (12/1 job B) can be incorporated, does not exist in the first processing or the second processing as described above, then the start schedule adjusting section 14 selects a job X with priority lower than that of the reset job B on the basis of the priority in the 12/2 job definition file 23*t*, and sets the selected job X in the start schedule deletion table.

On the basis of the execution possible time zone table updated by deleting the start schedule of the low priority job, the start schedule adjusting section 14 determines whether an execution possible time zone, in which the estimated execution time of the reset job B can be incorporated, exists. When a corresponding execution possible time zone exists, the start schedule adjusting section 14 sets the start schedule of the reset job B in the execution possible time zone.

In this way, until the execution possible time zone, in which the estimated execution time of the reset job B can be incorporated, can be specified from the updated execution possible time zone table, the processing for deleting a low priority job from the 12/2 job definition file 23*t*, and the processing for specifying the execution possible time zone in the execution possible time zone table updated by the deletion of the low priority job are repeated.

Figure 15:
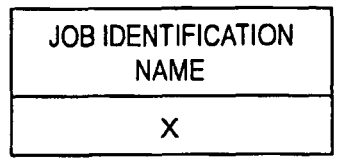
FIG. 15 is a figure illustrating an example of a start schedule deletion table.

FIG. 15 is a figure illustrating an example of the data item of the start schedule deletion table.

The job identification number (job X), used to identify the job whose start schedule is deleted by the start schedule adjusting section 14, is set in the start schedule deletion table.

Figure 16A:
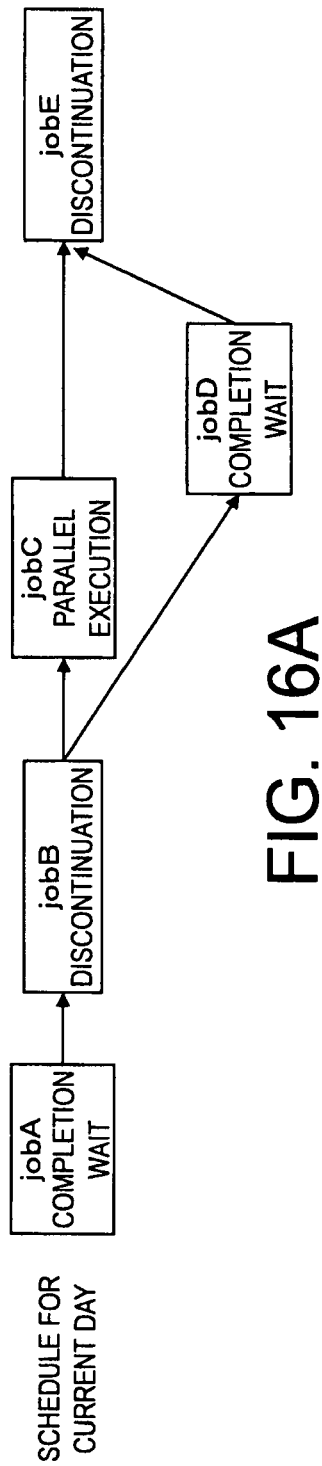
FIGS. 16A and 16B are figures illustrating execution relationships between the jobs, which is based on the definition information of the first and second job definition files.
Figure 16B:
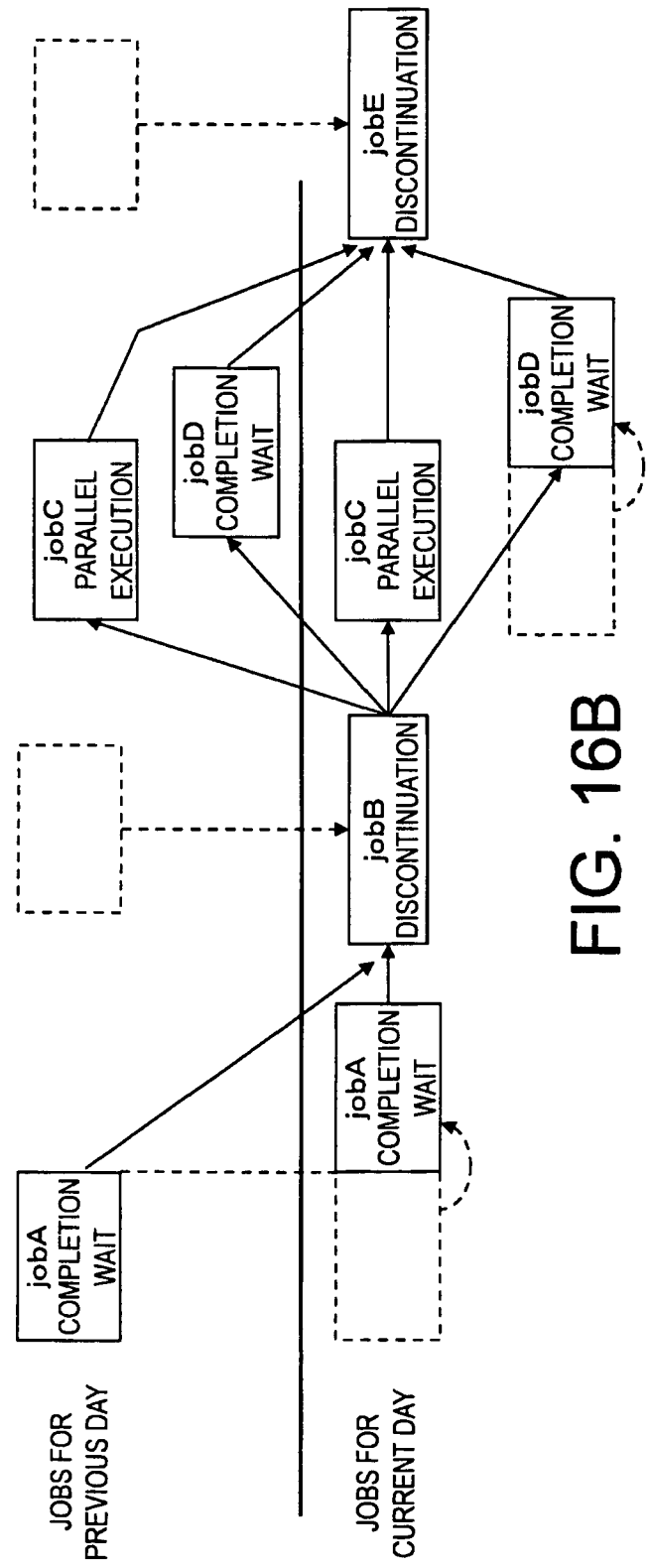

FIGS. 16A and 16B are figures illustrating relationships between the jobs A to E based on the definition information of the 12/2 job definition file 23*t* and of the 12/1 job definition file 23*p*.

FIG. 16A is a figure illustrating job execution relationships between the jobs A to E based on the definition information of the job definition master file 21. FIG. 16B is a figure illustrating a job execution relationship in the schedule which is adjusted by incorporating the start schedule of the unexecuted job in the 12/1 job definition file 23*p* into the start schedule of the jobs in the 12/2 job definition file 23*t*.

The start schedule time setting section 15 calculates the start schedule time of each of the jobs on the basis of the relationship between the start schedules of the jobs in the schedule (see FIG. 16B) that is adjusted according to the definition information in the 12/1 job definition file 23*p* and the definition information in the 12/2 job definition file 23*t* in which the start schedule of the reset job B is set by the start schedule adjusting section 14. Then, the start schedule time setting section 15 sets the calculated start schedule time of each of the jobs in the data item of "start schedule time".

FIG. 17 is a figure illustrating an example of the 12/1 job definition file 23*p* in which the start schedule time is set, and FIG. 18 is a figure illustrating an example of the 12/2 job definition file 23*t* in which the start schedule time is set.

When a job is set in the start schedule deletion table, the deleted job notifying section 16 outputs the presence of the job with the deleted start schedule, and the contents of the start schedule deletion table to the client 2 via the communication section 40. The deleted job notifying section 16 creates, for example, a message "Start schedule of job xxx was deleted", and makes the message displayed by display means of the client 2.

On the basis of the 12/2 job definition file 23*t* and the 12/1 job definition file 23*p*, the display section 17 generates an execution schedule chart illustrating the start schedule time and the estimated execution time of each of the jobs, and outputs the execution schedule chart to the client 2 via the communication section 40.

Specifically, on the basis of the 12/1 job definition file 23*p* shown in FIG. 17 and of the 12/2 job definition file 23*t* shown in FIG. 18, the display section 17 generates a Gantt chart illustrating the start schedule time and the estimated execution time of each of the jobs, so as to make the generated Gantt chart outputted by known output means (such as a display apparatus and a printing apparatus) included in the client 2.

Figure 19:
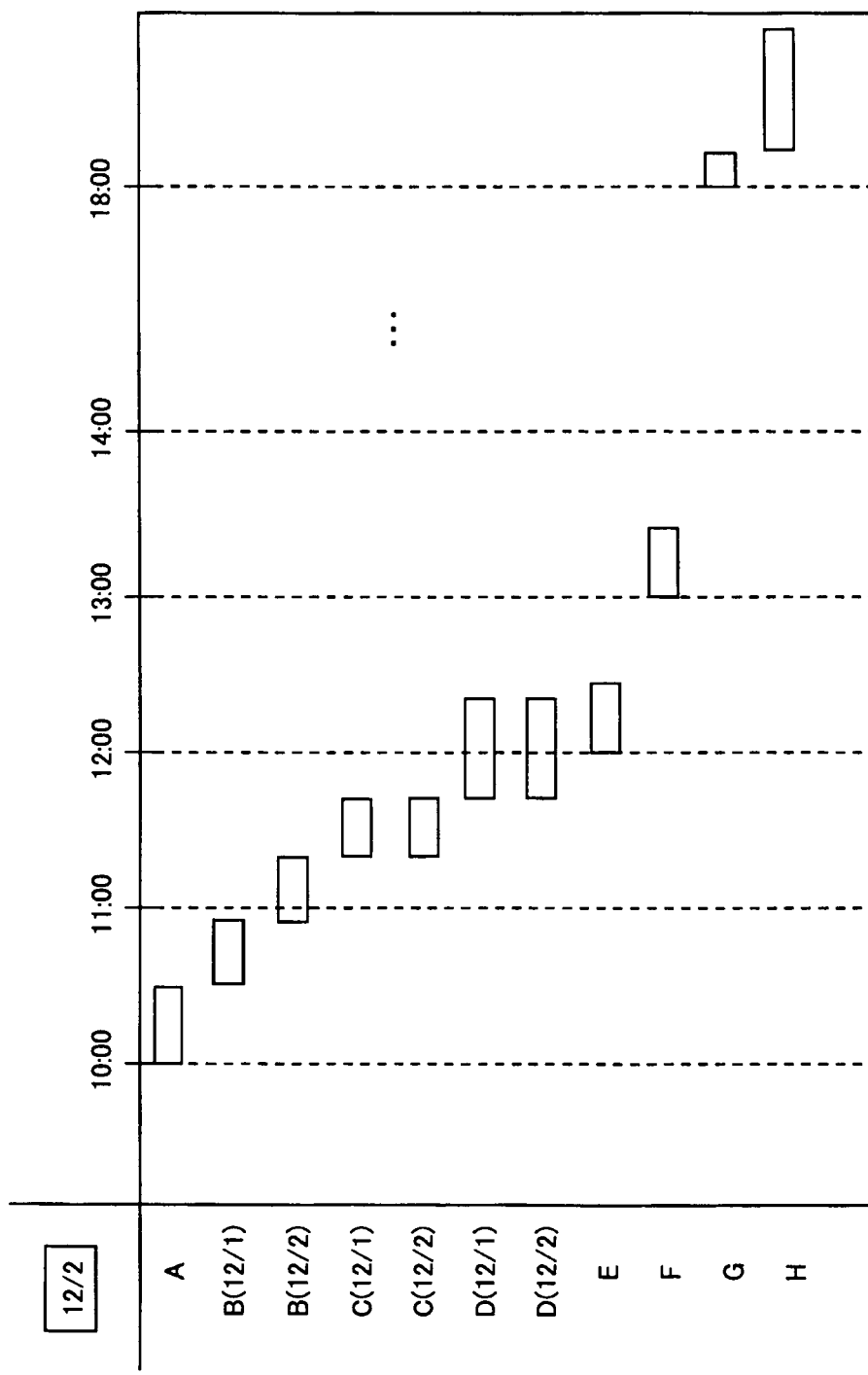
FIG. 19 is a figure illustrating an example of an execution schedule chart.

FIG. 19 is a figure illustrating an example of an execution schedule chart which is outputted in the client 2.

The execution schedule chart shown in FIG. 19 represents that the jobs are started and executed in the following order: the job A for the current day set for 12/2 beforehand, the job B (B 12/2) for the current day, the reset job B (B12/1), the job C (C12/1) related to the reset job, the job C (C12/2) for the current day, the job D (D12/1) related to the reset job, the job D (D12/2) for the current day, the job E for the current day, the job F for the current day, the job G for the current day, and the job H for the current day.

In the following, a flow of processing performed by the management apparatus 10 in an embodiment will be described.

Figure 20:
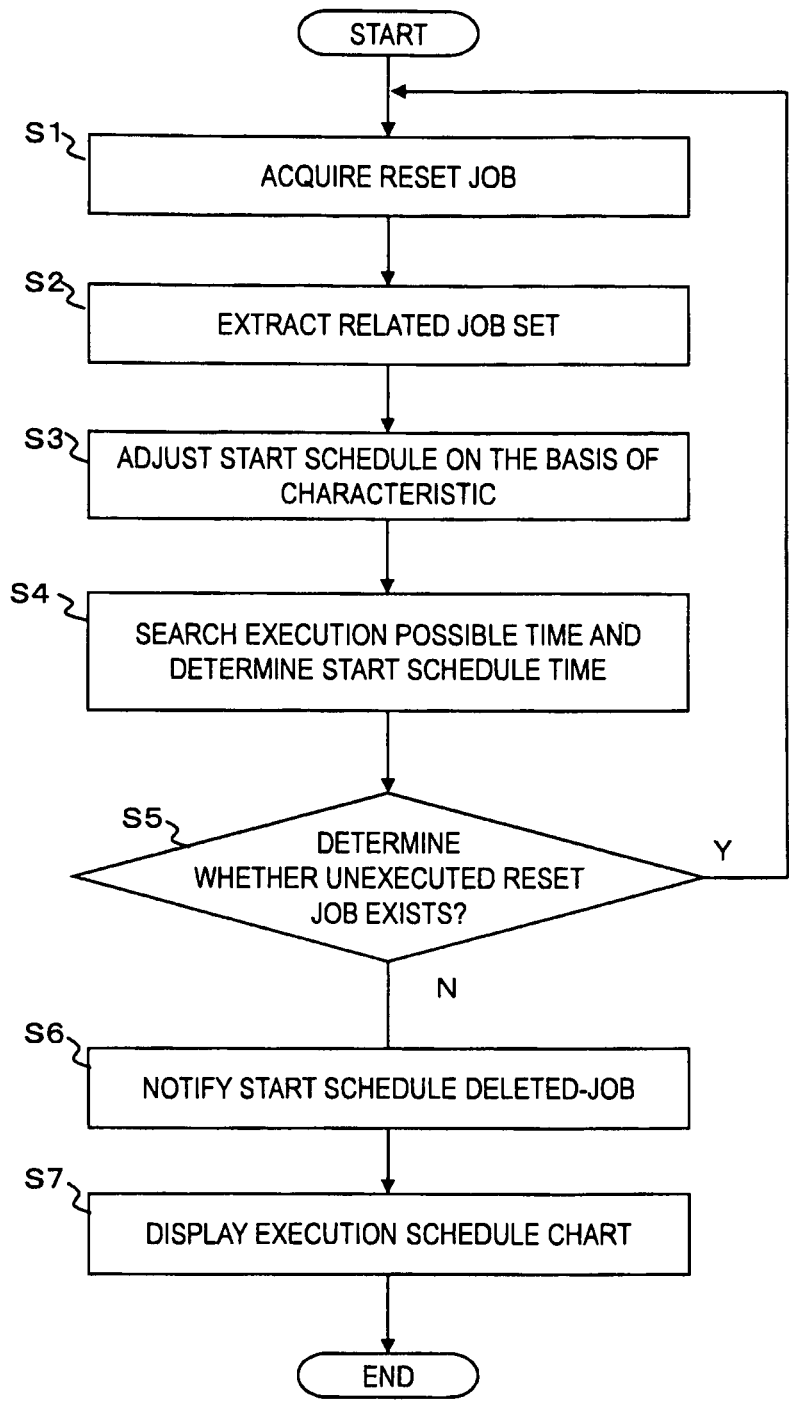
FIG. 20 is a figure illustrating outline of a flow of processing performed by the management apparatus.

FIG. 20 is a figure illustrating the outline of the flow of processing performed by the management apparatus 10.

Step S1: Acquisition of Reset Job

The reset job specifying section 11 of the management apparatus 10 acquires, on the basis of the user instruction information obtained from the client 2, the 12/1 job definition file 23*p* and the 12/2 job definition file 23*t* from the data storage section 20. Further, the reset job specifying section 11 sets, as a reset job (job B), the job which is specified by the user among jobs included in the 12/1 job definition file 23*p* and having "state" of "abnormal termination".

Step S2: Extraction of Job Set

Figure 21:
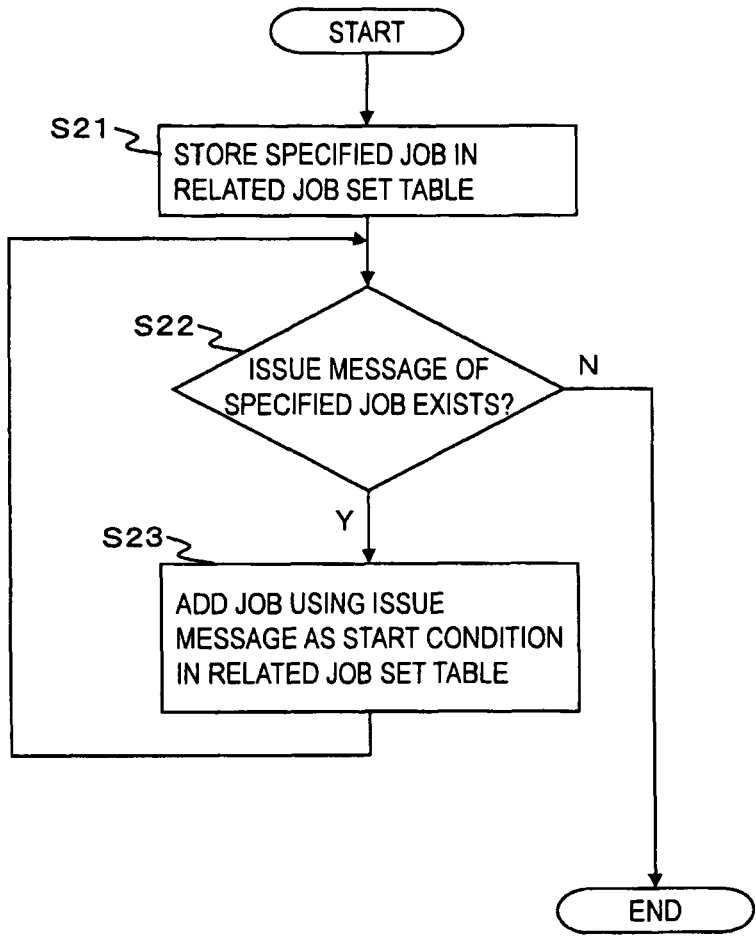
FIG. 21 is a figure illustrating a detailed process flow of the processing in step S2.

FIG. 21 is a figure illustrating a detailed process flow of step S2.

The job set extracting section 12 sets each specified reset job in the related job set table (step S21), and determines, with reference to the 12/1 job definition file 23*p*, whether the issue message of the specified reset job exists (step S22).

When the issue message of the specified reset job exists (Y in step S22), the job set extracting section 12 extracts the job using the issue message as the start condition, and additionally sets the extracted job in the related job set table (step S23).

When the issue message of the specified reset job does not exist (N in step S22), the job set extracting section 12 ends the processing.

Step S3: Start Schedule Adjustment Based on Job Characteristic

Figure 22:
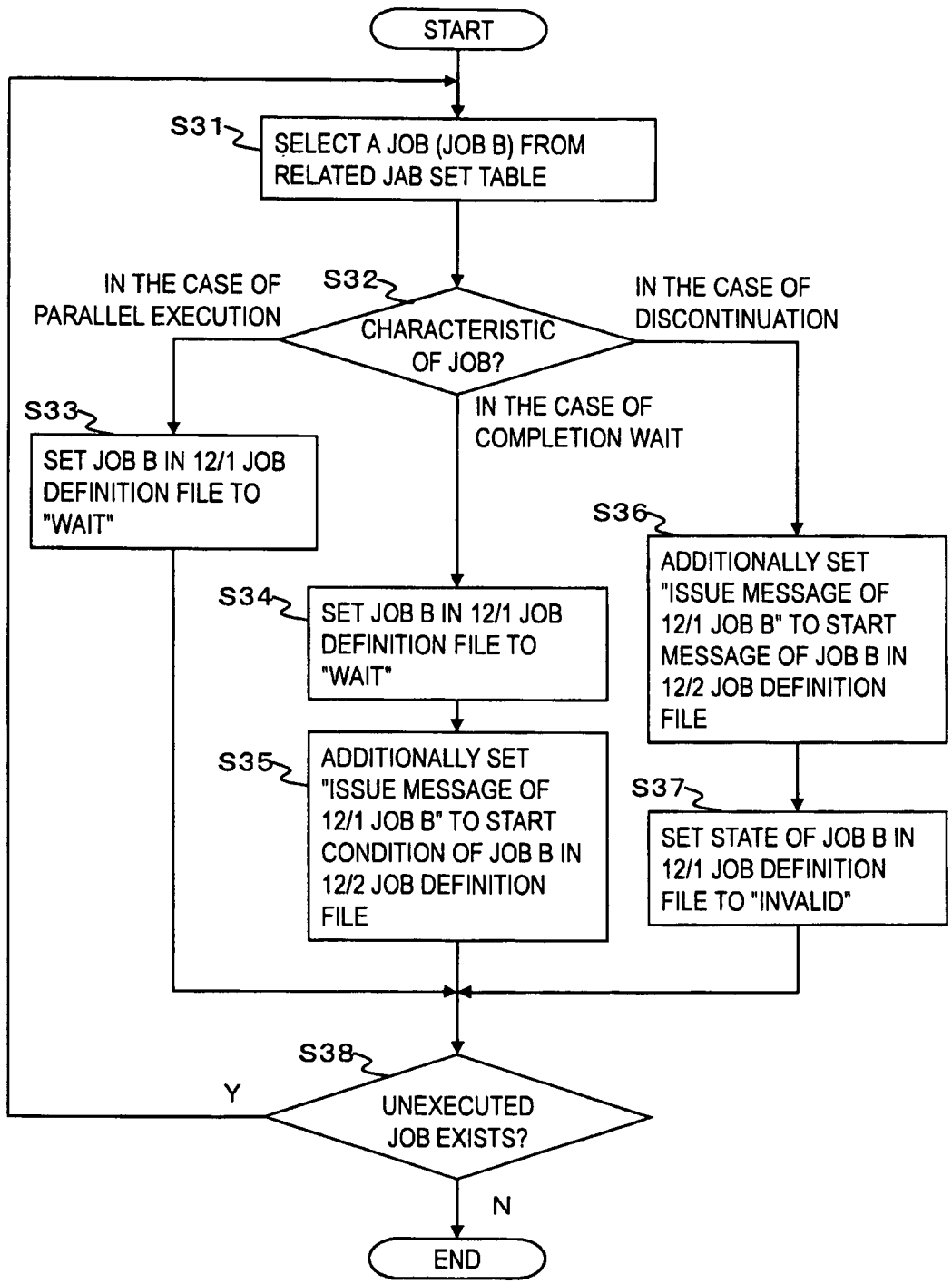
FIG. 22 is a figure illustrating a detailed process flow of the processing in step S3.

FIG. 22 is a figure illustrating a detailed process flow of step S3.

The start schedule adjusting section 14 selects a job (job B) from the related job set table (step S31), and determines the characteristic of the selected job (step S32).

When the characteristic of the selected job is "parallel execution", the start schedule adjusting section 14 changes "state" of the job B in the 12/1 job definition file 23p to "wait" (step S33).

When the characteristic of the selected job is "completion wait", the start schedule adjusting section 14 changes "state" of the job B in the 12/1 job definition file 23p to "wait" (step S34), and additionally sets the issue message (msgB1201) of the 12/1 job B to "start condition" of the job B in the 12/2 job definition file 23t (step S35).

When the characteristic of the selected job is "discontinuation", the start schedule adjusting section 14 additionally sets the issue message (msgB1201) of the 12/1 job B to the "issue message" of the job B in the 12/2 job definition file (step S36), and changes "state" of the job B in the 12/1 job definition file 23p to "invalid" (step S37).

When an unexecuted job exists in the related job set table (Y in step S38), the start schedule adjusting section 14 returns to the processing in step S31. When no unexecuted job exists in the related job set table (N in step S38), the start schedule adjusting section 14 ends the processing.

Figure 23:
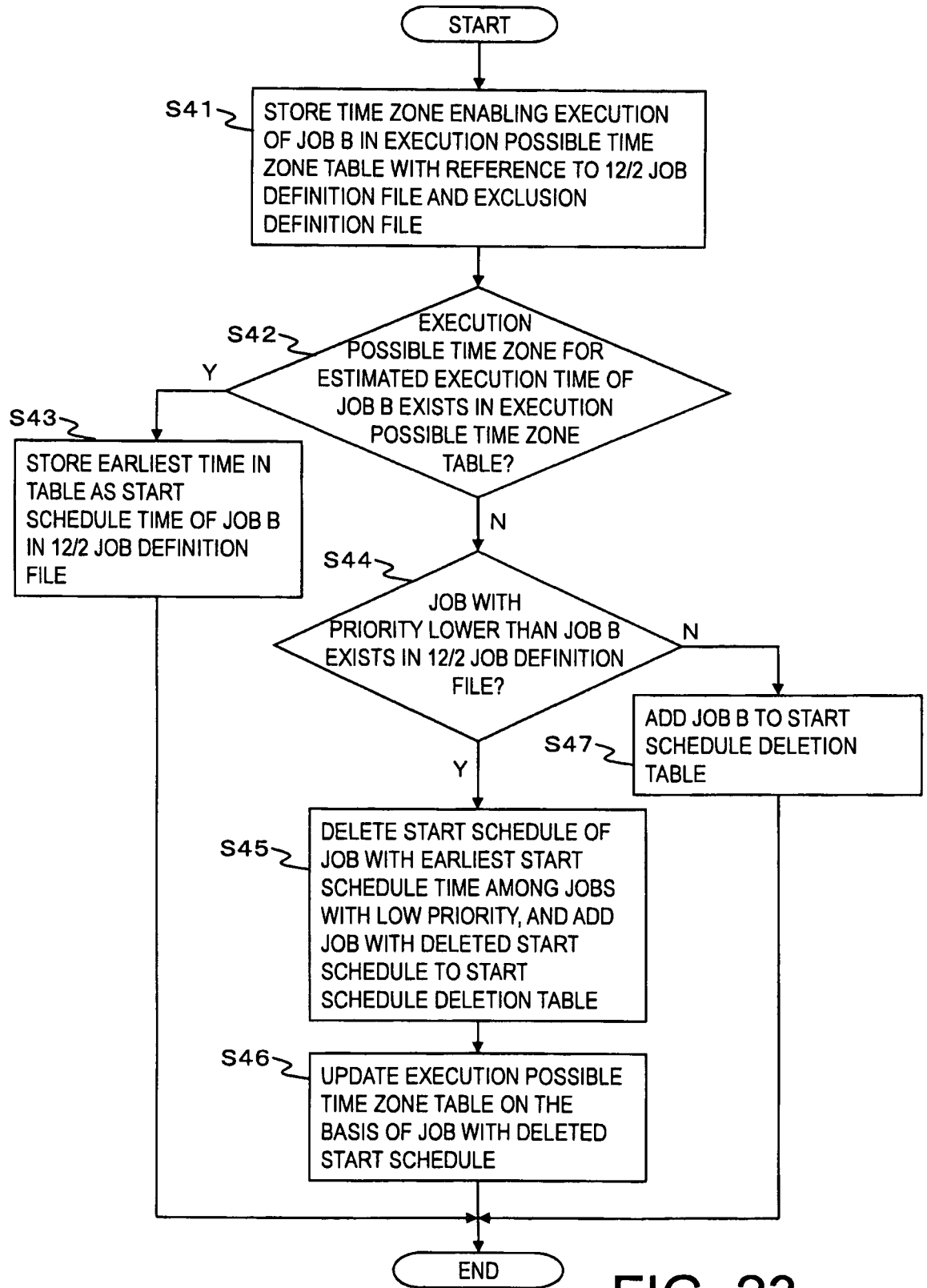
FIG. 23 is a figure illustrating a detailed process flow of the processing in step S4.

Step S4: Searching of Execution Possible Time and Determination of Start Schedule Time FIG. 23 is a figure illustrating a detailed process flow in step S4.

With reference to the 12/2 job definition file 23t and the exclusion definition file 22, the execution possible time zone calculating section 13 searches a time zone enabling execution of the job (job B) selected by the processing in step S31, and the execution possible time zone calculating section 13 stores the start time and end time of the searched time zone in the execution possible time zone table (step S41).

The start schedule adjusting section 14 determines whether an execution possible time zone not shorter than the estimated execution time of the processing target job (job B) exists in the execution possible time zone table (step S42).

When an execution possible time zone not shorter than the estimated execution time of the processing target job (job B) exists in the execution possible time zone table (Y in step S42), the start schedule time setting section 15 selects the earliest time (start time) among the corresponding execution possible time zones in the execution possible time zone table, so as to store, in the 12/1 job definition file 23p, the selected time as the start schedule time of the processing target job (job B).

When no execution possible time zone not shorter than the estimated execution time of the processing target job (job B) exists in the execution possible time zone table (N in step S42), the start schedule time setting section 15 determines whether a job with priority lower than that of the processing target job (job B) exists in the 12/2 job definition file 23t (step S44).

When a job with priority lower than that of the processing target job (job B) exists in the 12/2 job definition file 23t (Y in step S44), the start schedule adjusting section 14 selects a job with the earliest start schedule time among the jobs with priority lower than that of the processing target job (job B), then cancels the start schedule time of the selected job, and adds the selected job to the start schedule deletion table (step S45).

Then, the execution possible time zone calculating section 13 calculates the execution possible time zone of the processing target job (job B) by adding the estimated execution time of the job selected in step S45, and then updates the execution possible time zone table (step S46).

On the other hand, when no job with priority lower than that of the processing target job (job B) exists in the 12/2 job definition file 23t (N in step S44), the start schedule adjusting section 14 adds the processing target job (job B) to the start schedule deletion table (step S47).

Step S5: Determination of Existence of Unexecuted Reset Job

The start schedule adjusting section 14 checks whether an unexecuted reset job exists. When an unexecuted reset job exists, the start schedule adjusting section 14 returns to the processing in step S1. When no unexecuted reset job exists, the start schedule adjusting section 14 proceeds to the processing in step S6.

Step S6: Notification of Job with Deleted Start Schedule

Figure 24:
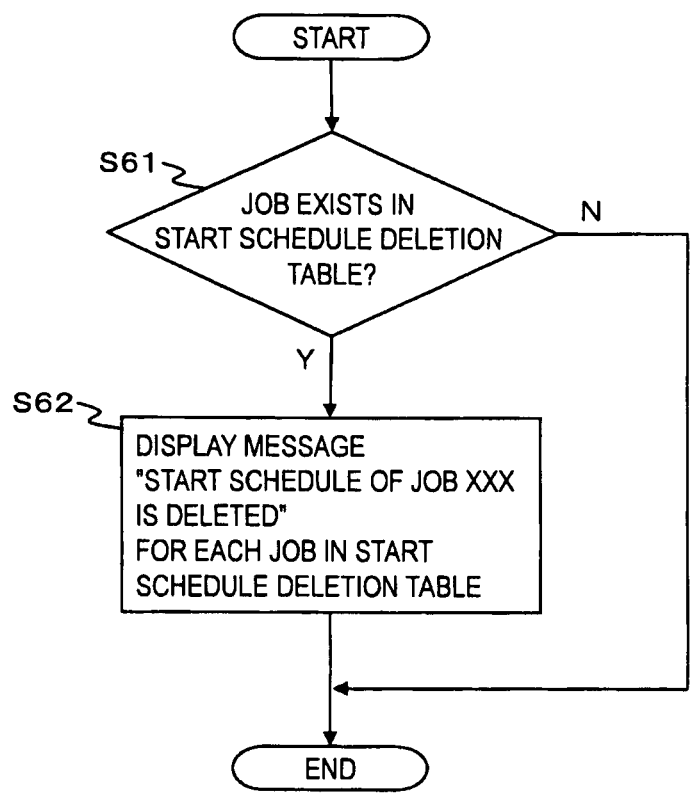
FIG. 24 is a figure illustrating a detailed process flow of the processing in step S6.

FIG. 24 is a figure illustrating a detailed process flow in step S6.

The deleted job notifying section 16 determines whether a job exists in the start schedule deletion table (step S61). When a job exists in the start schedule deletion table (Y in step S61), the deleted job notifying section 16 notifies a message of, for example, "Start schedule of job XXX was deleted" to the client 2 for each of the jobs which exist in the start schedule deletion table and the start schedule of which is deleted (step S62).

When no job exists in the start schedule deletion table (N in step S61), the deleted job notifying section 16 ends the processing.

Step S7: Display of Execution Schedule Chart

On the basis of the 12/2 job definition file 23t and the 12/1 job definition file 23p, the display section 17 extracts each job whose start schedule time is set, and creates a chart data (execution schedule chart) illustrating the start schedule time and the estimated execution time of the each job, so as to make the chart data outputted to the output means of the client 2.

Figure 25:
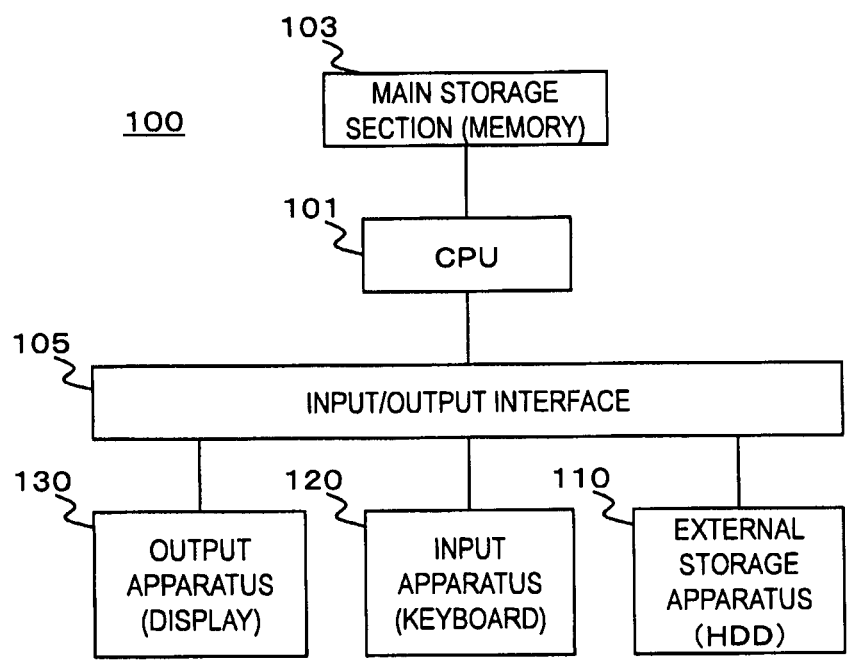
FIG. 25 is a figure illustrating an example of a hardware configuration of a server including the management apparatus.

FIG. 25 is a figure illustrating an example of a hardware configuration of the server 1 having the management apparatus 10.

As shown in FIG. 25, the server 1 can be configured by a computer 100 including a CPU 101, a main storage section (memory) 103, an input/output interface 105, an external storage apparatus 110, an input apparatus (keyboard, and the like) 120, and an output apparatus (display, and the like) 130.

Further, the server 1 can be configured by a program which can be executed by the computer 100. In this case, a program describing the processing contents to be provided in the management apparatus 10 and to be executed by the respective processing sections is provided in the server 1. When the computer 100 executes the program provided in the server 1, the processing functions of the management apparatus 10 in the above described server 1 are realized on the computer 100. That is, the reset job specifying section 11, the job set extracting section 12, the execution possible time zone calculating section 13, the start schedule adjusting section 14, the start schedule time setting section 15, the deleted job notifying section 16, and the display section 17, which are included in the management apparatus 10, can be configured by the program, and the data storage section 20 can be configured by the external storage apparatus 110.

Note that the computer 100 can also directly read the program from a portable type recording medium, so as to perform the processing according to the program. Further, each time the program is transmitted to the computer 100 from a server computer, the computer 100 can also successively perform the processing according to the received program.

Further, the program can be recorded in a recording medium which can be read by the computer 100.

As described above, when the management apparatus 10 is applied to the processing for managing the schedule of job execution in the server 1, the following effects can be obtained.

According to the management apparatus 10, a job execution schedule, in which a start schedule of a job that is abnormally terminated and restored is incorporated, can be automatically created without requiring manual operation of the user. That is, the management apparatus 10 can automatically perform, as the processing for managing the execution schedule of jobs executed by the job execution section 30, the schedule adjustment processing in which the restart schedule of the job abnormally terminated in the already executed execution schedule and the restart schedule of the job related to the abnormally terminated job are incorporated into the schedule to be executed in future. Particularly, when an execution schedule which is repeatedly executed every day is set, the start schedule of each job can be set according to the characteristic about the start of each job, and hence the start schedule can be effectively and automatically adjusted.

Further, when the execution sequence of jobs is associated with their start conditions, the start schedule of the jobs can be automatically adjusted in consideration of the start conditions and the exclusion conditions of the jobs.

Thereby, the burden of adjusting the execution schedule of the restored job can be significantly reduced.

Further, the management apparatus 10 can adjust not only the start schedule of each single job but also the start schedule of each job group including jobs related to a single job. Further, the management apparatus 10 can adjust the start schedule by specifying a group of jobs related to the job which is specified by the user among the abnormally terminated jobs.

Thereby, the start schedule can be adjusted only for the necessary jobs.

Further, when there is no free time in which the start schedule of an abnormally terminated job is incorporated, the management apparatus 10 can adjust the start schedule by cancelling the start schedule of the job with low priority of execution. Further, the management apparatus 10 can notify, to the client, the job whose start schedule is cancelled.

This enables the user to recognize the job whose start schedule cannot be secured by the automatic schedule adjustment processing, and can support the user to determine the necessity of a schedule adjustment work.

Further, the management apparatus 10 can generate and output a chart data illustrating the execution schedule in which the start schedules of the jobs are adjusted.

Thereby, the adjusted execution schedule can be visualized so as to enable the user to easily check the schedule.

According to the management apparatus disclosed by this application, it is possible to automatically perform the processing in which, after restoration of the abnormally terminated job, and the like, the execution schedule of jobs whose start schedule is already set is adjusted by incorporating the start schedule for re-execution of the abnormally terminated job into the execution schedule. Particularly, the start schedule of the job to be re-executed is incorporated on the basis of the characteristics relating to the start of the job to be re-executed, and hence the adjustment can be suitably performed on the basis of the restrictions on the execution of each of the jobs. Thereby, the burden of the work of managing the execution schedule can be significantly reduced.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A job managing apparatus comprising:
    a storage to store job execution data including statuses of a plurality of executed jobs and a plurality of planned jobs; and
    at least one processor connected with the storage, to execute:
        specifying an intermitted job from the job execution data stored in the storage, wherein the statuses, included in the job execution data, indicate whether and how each job completes a scheduled execution, respectively;
        determining, using the job execution data, whether a corresponding planned job that is to execute a same operation as the intermitted job is scheduled;
    specifying an operation condition of the intermitted job based on the job execution data and a result of the determining, wherein the operation condition includes information related to job execution associating a status of the intermitted job in relation to the corresponding planned job;
    deleting the intermitted job, while the corresponding planned job has been scheduled, when discontinuation is set in the information of the operation condition; and
    setting re-execution of the intermitted job as a planned job when information other than the discontinuation is set in the information of the operation condition.

2. A method executed by a processor, method comprising:
    specifying an intermitted job from job execution data stored in a storage, the job execution data including statuses of a plurality of executed jobs and a plurality of planned jobs, the statuses indicating whether and how each job completes a scheduled execution, respectively;
    determining, using the job execution data, whether a corresponding planned job that is to execute a same operation as the intermitted job is scheduled;
    specifying an operation condition of the intermitted job based on the job execution data and a result of the determining, wherein the operation condition includes information related to job execution associating a status of the intermitted job in relation to the corresponding planned job;
    deleting the intermitted job, while the corresponding planned job has been scheduled, when discontinuation is set in the information of the operation condition; and
    setting re-execution of the intermitted job as a planned job when information other than the discontinuation is set in the information of the operation condition.

3. A non-transitory computer-readable and non-transitory medium storing a job-management program causing a computer to execute a process comprising:
    specifying an intermitted job from job execution data stored in a storage, the job execution data including statuses of a plurality of executed jobs and a plurality of planned jobs, the statuses indicating whether and how each job completes a scheduled execution, respectively;

determining, using the job execution data, whether a corresponding planned job that is to execute a same operation as the intermitted job is scheduled;

specifying an operation condition of the intermitted job based on the job execution data and a result of the determining, wherein the operation condition includes information related to job execution associating a status of the intermitted job in relation to the corresponding planned job;

deleting the intermitted job, while the corresponding planned job has been scheduled, when discontinuation is set in the information of the operation condition; and setting re-execution of the intermitted job as a planned job when information other than the discontinuation is set in the information of the operation condition.

4. The job-managing apparatus according to claim 1, wherein the processor executes searching to identify a time zone in which the intermitted job can be executed based on the job execution data and the operation condition specified.

5. The job-managing apparatus according to claim 4, wherein when statuses in the job execution data include an operation condition in which execution of a job is required to be completed before execution of a planned job executing a same operation, the controlling re-executes the intermitted job in the time zone identified in the searching, the time zone having a duration longer than an estimated time of execution of the intermitted job and being prior to a start set for the planned job executing the same operation.

6. The job-managing apparatus according to claim 4, wherein when statuses in the job execution data include an operation condition in which execution of a job is allowed to be performed independently from another planned job, the controlling re-executes the intermitted job in a time zone having a duration longer than an estimated time of execution of the intermitted job.

7. The job-managing apparatus according to claim 4, wherein when statuses in the job execution data include an operation condition in which execution of a job is not required when a planned job executing a same operation exists, the controlling re-executes the intermitted job in a time zone having a duration longer than an estimated time of execution of the intermitted job only upon determination that the corresponding planned job is not indicated.

8. The method according to claim 2, wherein the processor executes searching to identify a time zone in which the intermitted job can be executed based on the job execution data and the operation condition specified.

9. The method according to claim 8, wherein when statuses in the job execution data include an operation condition in which execution of a job is required to be completed before execution of a planned job executing a same operation, the controlling re-executes the intermitted job in the time zone identified in the searching, the time zone having a duration longer than an estimated time of execution of the intermitted job and being prior to a start set for the planned job executing the same operation.

10. The method according to claim 8, wherein when statuses in the job execution data include an operation condition in which execution of a job is allowed to be performed independently from another planned job, the controlling re-executes the intermitted job in a time zone having a duration longer than an estimated time of execution of the intermitted job.

11. The method according to claim 8, wherein when statuses in the job execution data include an operation condition in which execution of a job is not required when a planned job executing a same operation exists, the controlling re-executes the intermitted job in a time zone having a duration longer than an estimated time of execution of the intermitted job only upon determination that the corresponding planned job is not indicated.

12. The non-transitory computer-readable medium according to claim 3, wherein the processor executes searching to identify a time zone in which the intermitted job can be executed based on the job execution data and the operation condition specified.

13. The non-transitory computer-readable medium according to claim 12, wherein when statuses in the job execution data include an operation condition in which execution of a job is required to be completed before execution of a planned job executing a same operation, the controlling re-executes the intermitted job in the time zone identified in the searching, the time zone having a duration longer than an estimated time of execution of the intermitted job and being prior to a start set for the planned job executing the same operation.

14. The non-transitory computer-readable medium according to claim 12, wherein when statuses in the job execution data include an operation condition in which execution of a job is allowed to be performed independently from another planned job, the controlling re-executes the intermitted job in a time zone having a duration longer than an estimated time of execution of the intermitted job.

15. The non-transitory computer-readable medium according to claim 12, wherein when statuses in the job execution data include an operation condition in which execution of a job is not required when a planned job executing a same operation exists, the controlling re-executes the intermitted job in a time zone having a duration longer than an estimated time of execution of the intermitted job only upon determination that the corresponding planned job is not indicated.

* * * * *